United States Patent Office 3,165,445
Patented Jan. 12, 1965

3,165,445
ANTI-PERNICIOUS ANAEMIA FACTOR OF THE FUNDUS AND METHOD OF PREPARING SAME
Edward Abram Greenspon, Apt. 304, 4851 Cote St., Luc Road, Montreal, Quebec, Canada
No Drawing. Filed Mar. 26, 1962, Ser. No. 182,611
Claims priority, application Great Britain July 11, 1958
8 Claims. (Cl. 167—74)

This invention relates to the preparation from animal stomach material of anti-pernicious anaemia factor, hereinafter termed I.F. ("intrinsic factor") for the sake of brevity.

In my United States Patent No. 2,103,075, I have described a method of making from the stomach of a freshly killed animal a preparation containing a sufficiently high proportion of I.F. to be used in the treatment of pernicious anaemia. This method consisted in treating either the whole stomach or preferably the mucosa from the whole stomach with a pepsin extractant which is not itself injurious to I.F., whereby the stomach material is rendered substantially free from pepsin, and it was based on the discovery that active pepsin is destructive of or antagonistic to I.F., which can only be satisfactorily preserved and used in its absence or when it is present only in small quantities. By active pepsin is meant pepsin in a liquid or semi solid acid medium, in which it is capable of exerting its proteolytic action. By "stomach of a freshly killed animal" I mean that the time elapsing between the death of the animal and the extraction of the pepsin is not so great that an important proportion of the I.F. present is destroyed; this time can naturally be longer, the lower the temperature.

Unfortunately the compositions so produced contain a relatively small proportion of I.F., so that the amount which has to be ingested may be undesirably great, especially as it may not be particularly palatable.

It is therefore an object of the invention to produce from the animal stomach compositions containing a substantially higher proportion of I.F. A further object is to provide a method of extracting the pepsin in which an acid is not used, and in which thereof temperatures higher than 37° C. can be employed without causing substantial loss of I.F. Further objects will appear from the following description.

Anatomically, the stomach comprises three parts or regions known as the cardia, fundus and pylorus respectively. When these parts of the hog or other animal stomach are separately washed soon after the death of the animal, I.F. is found in the washed stomach material from the cardia and pylorus but not in that from the fundus, giving rise to the belief that the site of I.F. secretion is in the pylorus. This was regarded as surprising, inasmuch as in the human stomach the site of secretion was believed to be in the fundus; nevertheless the fact was undoubted, and has led to the belief that preparations comprising I.F. cannot be obtained from the fundus in the absence of other parts of the stomach.

The present invention rests on the unexpected discovery that, by isolating the fundus (after Meulengracht's anatomical description) of the animal stomach and subjecting it to extraction or other treatment to remove the pepsin, there is obtained a preparation which not only contains I.F., but has an effective I.F. content (as estimated by the dose required) at least ten times as great as the whole stomach preparations previously known. This is advantageous not only economically but also medically, since the amount of the stomach preparation which must be ingested if treatment is to be effective is correspondingly reduced.

According to the invention therefore a composition comprising anti-pernicious anaemia factor is produced by isolating the fundus of the stomach from a freshly killed animal and removing by extraction with an aqueous acid, or by permanent inactivation or destruction by an aqueous alkali, at least the greater part of its pepsin content. If the extracted material is dried, as it usually will be, this must be done at a temperature not exceeding 60° C.

While I do not wish to be bound by any theory, I believe that in the animal stomach, as in the human, the actual site of secretion of I.F. is in the mucosa of the fundus, from which it is carried by the gastric juice to the other parts of the stomach where it is adsorbed. to some extent on the mucosa and is protected from pepsin attack by the proteinaceous material contained therein. This adsorption is purely mechanical and the I.F. can, as already related, be washed off. In the fundus, on the other hand, no such protection against pepsin attack is available, because the fundus mucosa is the seat of production of large amounts of pepsin and hydrochloric acid—i.e. of active pepsin. This pepsin quickly destroys the I.F. after injection into the achytic stomach of the pernicious anaemia patient, and perhaps also to some extent before.

The treatment of the fundus to free it from pepsin may follow the lines described in my United States specification No. 2,103,075 for making the whole stomach preparation, though I have now found that it is not essential to work at low temperatures. Thus the fundus as a whole, or preferably the mucosa which has been stripped from the muscularis of the fundus, may be stirred with a weak acid, e.g. dilute hydrochloric acid, at a pH down to about 3.8 at about 0° C. or at a higher temperature, e.g. a temperature up to room temperature, say 15° C., for example for about 12 to 24 hours. Acetone may then be added and the liquid well stirred. The liquid may then be separated from the minced solid material as by filtration or decantation. The solid may then be dried as described in more detail below and, if desired, used without further addition in the treatment of pernicious anaemia.

The liquid may be treated at once to remove the pepsin. Preferably, however, it is first given a preliminary treatment to precipitate some solids other than pepsin which it contains. This may, for instance, be done by adding acetone, e.g. in amount between 2.5 and 3.5 times the volume of the aqueous hydrochloric acid, stirring for a short time, e.g. 15–60 minutes, and then filtering. The solid residue may with advantage be added to the extracted fundus material.

The pepsin may be recovered from the solution by bringing its pH to about 2.8–3.8, and preferably 3.4–3.6, as by the addition of further dilute hydrochloric acid, and then adding further acetone, e.g. in amount sufficient to bring its concentration to about 70–80% by weight; the precipitated pepsin may then be filtered off. The liquid remaining may contain further I.F. and may be used as such or after concentration or dilution, or may for example be added to the extracted fundus material.

An alternative better and simpler method is to add an alkali, especially sodium or other alkali metal hydroxide, to the minced and preferably washed fundus material to produce a pH of about 7–10. This may be stirred and left a few minutes or longer, resulting in inactivation or destruction of all pepsin without damage to I.F. The material will usually be brought back to a pH below 7, e.g. returned to its original pH of about 6, before drying.

The extracted fundus material obtained by either method, with or without addition from an acid extract as described above, may be dried by heating it gently in a current of air. It is not heated to a temperature above 60° C., since at this temperature decomposition of the I.F. may begin to occur. Very suitably the drying may be effected at temperatures between room temperature and 45° C.

It will usually be desirable to give the material a de-fatting treatment before use so as to reduce its taste and odour. Various standard techniques for de-fatting are available. The material may then, if desired, be finely ground and tabletted or may be embodied in capsules or otherwise prepared for therapeutic administration.

It is not necessary that the whole of the pepsin should be removed from the fundus material, and a satisfactory product can be obtained when, for example, at least 85% of the pepsin content is removed.

The invention is illustrated by the following examples:

Example I 1 kg. of mucosa from the fundus of hog stomach, which had been well washed with iced water, was finely minced and stirred with 400 cc. of 2% aqueous hydrochloric acid at room temperature for between 12 and 24 hours. To the resulting mixture was added 1250 cc. of acetone, and stirring was continued for ½ hour, after which the solid precipitated was filtered off and put on one side. The filtrate was then brought to a pH of 3.4–3.6 with dilute hydrochloric acid, after which 625 cc. of acetone at 0° C. was added so as to precipitate the pepsin. The precipitate was filtered off. The acetone solution remaining was added to the extracted fundus mucosa, and the total mass was then dried in a current of air at 45° C.

Example II

To minced and washed mucosa as employed in Example I there was added sufficient of a 2% sodium hydroxide solution to bring its pH to a level between 8 and 10. The mixture was well stirred, and then allowed to stand for about 15 minutes. The sodium hydroxide solution was then filtered off. The pH of the solid residue was restored to about 6 with dilute hydrochloric acid in order to make it conform to the reaction of the patient's gastric contents and to render it more palatable, and the product was dried in a current of air at room temperature.

The products obtained in accordance with these examples were employed in tablet form in the treatment of pernicious anaemia, the amounts administered being about 0.1 times the doses normally necessary with whole stomach preparations obtained in accordance with my United States specification aforesaid.

The effectiveness of the new preparation was demonstrated by the well known "Double reticulocyte test." A sufferer from pernicious anaemia was given 10 g. daily of unwashed pylorus material for 10 days, at the end of which time there was no perceptible increase in the number of reticulocytes in the blood. This was followed by the administration of similar doses of depepsinised fundus material obtained in accordance with Example II; in this case a reticulocyte peak of 18% was observed after 9 days, by which time also the red blood cell count had begun to rise.

Example III

Minced fundus mucosa was washed overnight with running water. The pH of the washed material was brought to 7 by adding a concentrated aqueous sodium hydroxide solution, and the resulting gelatinous mass was vigorously stirred for about 15 minutes. The sodium hydroxide solution was removed as far as possible, and the pH of the product brought back to 6 with dilute hydrochloric acid; the product was dried as in Example II. The dried product was found to be completely free from pepsin.

This application is a continuation-in-part of my application Serial No. 817,077, filed June 1, 1959, now abandoned.

I claim:

1. Process for the production of a composition comprising anti-pernicious anaemia factor, which comprises separating the fundus from the stomach of a freshly killed animal, subjecting the separated fundus to the action of an agent selected from the group which consists of acids and alkalis whereby its content of pepsin is reduced by from 85 to 100%, and drying the treated material at a temperature of at most 60° C.

2. Process for the production of a composition comprising anti-pernicious anaemia factor, which comprises separating the fundus from the stomach of a freshly killed animal, subjecting the separated fundus to extraction with a weak acid solution at a pH down to 3.8 until its content of pepsin has been reduced by from 85 to 100%, and drying the extracted material at a temperature of at most 60° C.

3. Process for the production of a composition comprising anti-pernicious anaemia factor, which comprises separating the fundus from the stomach of a freshly killed animal, subjecting the separated solid fundus material to treatment with an alkali metal hydroxide solution at a pH of 7 to 10 until its pepsin content has been reduced by from 85 to 100%, and drying the treated material at a temperature of at most 60° C.

4. Process for the production of a composition comprising anti-pernicious anaemia factor, which comprises separating the fundus from the stomach of a freshly killed hog, subjecting the separated solid fundus material to treatment with an alkali metal hydroxide solution at a pH of 8 to 10 until its pepsin content has been reduced by from 85 to 100%, reducing the pH of the treated material below 7, and drying the material at a temperature of at most 60° C.

5. Process for the production of a composition comprising anti-pernicious anaemia factor, which comprises separating the fundus from the stomach of a freshly killed hog, separating the mucosa of the fundus from the muscularis, subjecting the said mucosa to treatment with an alkali metal hydroxide solution at a pH 7 to 10 until its pepsin content has been reduced by from 85 to 100%, reducing the pH of the treated material below 7, and drying the material at a temperature of at most 60° C.

6. Process for the production of a composition comprising anti-pernicious anaemia factor, which comprises separating the fundus from the stomach of a freshly killed hog, subjecting the separated fundus to treatment with a sodium hydroxide solution at a pH of 7 to 10 until its pepsin content has been reduced substantially to zero, restoring the pH of the treated material to its original value of about 6, and drying the material at a temperature between room temperature and 45° C.

7. A therapeutic composition for use against anaemia, comprising dried fundus material from the stomach of a freshly killed animal having between 0 and 15% of its original pepsin content.

8. A therapeutic composition for use against anaemia, comprising defatted dried fundus mucosa from the stomach of a freshly killed hog substantially free from pepsin.

References Cited in the file of this patent

UNITED STATES PATENTS 2,103,075    Greenspon _____ Dec. 21, 1937

OTHER REFERENCES

Fox: Am. J. of the Medl. Scs., vol. 203, January 1942, pp. 18–28 (particularly pages 18–21, 23, 24, 26–28).

Christensen: Am. J. of the Medical Sciences, vol. 215, 1948, pages 17, 18 and 22.

Ungley: The Lancet, May 30, 1936, pages 1232–1235.

Uotila: Acta Medica Scandinavica, vol. 45, 1938, pages 415, 429 and 431.

Latner: Biochem. Soc. Symposia No. 13, 1955, pages 69 and 74.